US007724176B1

(12) United States Patent
Pruett et al.

(10) Patent No.: US 7,724,176 B1
(45) Date of Patent: May 25, 2010

(54) ANTENNA ARRAY FOR AN INVERSE SYNTHETIC APERTURE RADAR

(75) Inventors: James A. Pruett, Allen, TX (US); Timothy E. Adams, Allen, TX (US); Christopher T. Moshenrose, Allen, TX (US); Jerry M. Grimm, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/404,041

(22) Filed: Mar. 13, 2009

(51) Int. Cl.
*G01S 7/28* (2006.01)
*G01S 13/90* (2006.01)

(52) U.S. Cl. .................. 342/25 R; 342/25 A; 342/175; 342/368; 343/774; 343/777; 343/844; 343/879; 343/886; 343/892

(58) Field of Classification Search ............... 342/25 R, 342/25 A–25 F, 175, 368–372; 343/774, 343/776, 786, 844, 874, 879, 886, 890–893, 343/897
See application file for complete search history.

(56) References Cited

U.S. PATENT DOCUMENTS 3,553,701 A * 1/1971 Thomas ...................... 343/766
4,755,821 A 7/1988 Itoh et al. ................... 343/700
5,182,562 A 1/1993 Witte .......................... 342/25
5,515,059 A * 5/1996 How et al. .................. 342/372
6,366,259 B1 * 4/2002 Pruett et al. ................. 343/853
6,501,414 B2 12/2002 Arndt et al. ................... 342/22
7,423,604 B2 9/2008 Nagai ......................... 343/776
7,463,193 B2 12/2008 Brunasso et al. ............ 342/383
7,479,884 B1 1/2009 Fullerton .................. 340/5.72
2008/0251115 A1 * 10/2008 Thompson et al. .......... 136/251

FOREIGN PATENT DOCUMENTS

EP 1764625 A1 * 3/2007

* cited by examiner

*Primary Examiner*—John B Sotomayor
(74) *Attorney, Agent, or Firm*—Baker Botts L.L.P.

(57) ABSTRACT

According to one embodiment, an antenna array includes a plurality of racks that are each configured with a plurality of antenna elements. Each rack may be rotated relative to the other racks through an axis that is generally parallel to the axis of other racks. Each antenna element within each rack has an axial orientation that is generally similar to and has an elevational orientation that is individually adjustable relative to one another.

18 Claims, 5 Drawing Sheets

ANTENNA ARRAY FOR AN INVERSE SYNTHETIC APERTURE RADAR

TECHNICAL FIELD OF THE DISCLOSURE

This disclosure generally relates to radars, and more particularly, to an antenna array for an inverse synthetic aperture radar and a method of using the same.

BACKGROUND OF THE DISCLOSURE

Synthetic aperture radars generate imagery by processing multiple received signals that have been reflected from a moving target. Inverse synthetic aperture radars include a particular class of synthetic aperture radars that generate imagery using movement of its antenna relative to the target. Synthetic aperture radars and inverse synthetic aperture radars may serve many useful purposes including generation of imagery that may be difficult to obtain using visual image generation mechanisms, such as video cameras, that generate imagery using the visible light spectrum. For example, synthetic aperture radars may generate imagery through generally opaque walls or during periods of inclement whether when fog or other type of precipitation may cause relatively poor visibility.

SUMMARY OF THE DISCLOSURE

According to one embodiment, an antenna array includes a plurality of racks that are each configured with a plurality of antenna elements. Each rack may be rotated relative to the other racks through an axis that is generally parallel to the axis of other racks. Each antenna element within each rack has an axial orientation that is generally similar to and has an elevational orientation that is individually adjustable relative to one another.

Some embodiments of the disclosure may provide numerous technical advantages. For example, one embodiment of the antenna array may be less complicated and thus cheaper and easier to operate than other known antenna arrays used by inverse synthetic aperture radars. In many cases, antenna signals are acquired using a relatively fixed orientation the various transmit and receive beams generated by individual elements of the antenna array. The antenna array of the present disclosure utilizes an articulated configuration in which the azimuthal and elevational orientation of each antenna element may be adjusted by manual intervention to provide a structure that may be easy to use and maintain relative to other more complicated antenna arrays for inverse synthetic aperture radars.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

As previously described, inverse synthetic aperture radars may be useful for generating imagery in conditions that may be relatively difficult to obtain using visible image generating devices, such as video cameras. An inverse synthetic aperture radar typically uses an antenna array that transmits microwave radiation and receives radiation that is reflected by one or more targets of interest. Due to the relative complexity and size of known antenna arrays configured for use with inverse synthetic aperture radars, however, their applications may be limited. For example, inverse synthetic aperture radars are typically implemented with active electronically scanned arrays that may be relatively complicated to use and operate.

Figure 1:
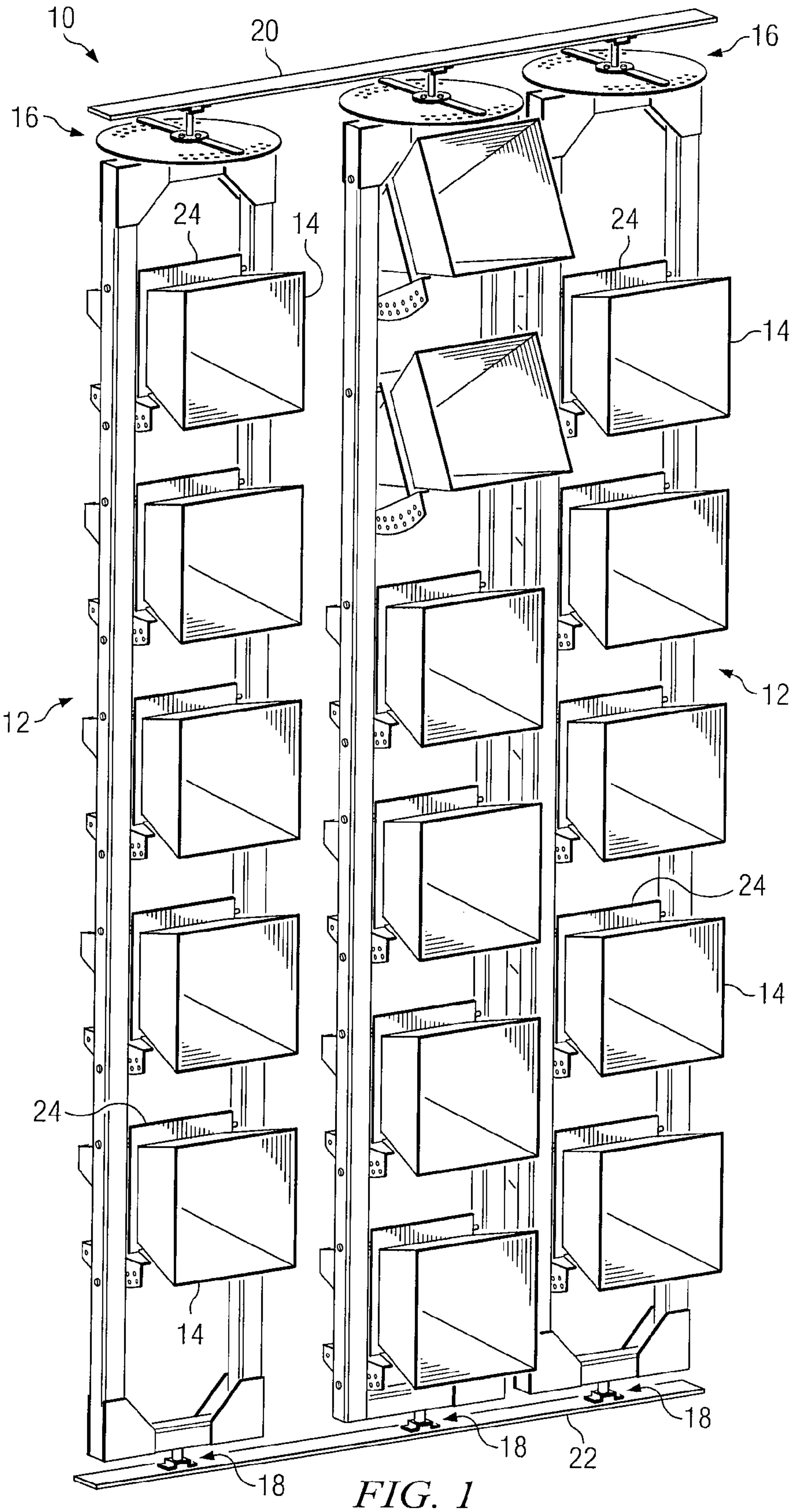
FIG. 1 is a perspective view of one embodiment of an antenna array according to the teachings of the present disclosure.

FIG. 1 shows one embodiment of an antenna array 10 that may provide a solution to these problems and other problems. Antenna array 10 includes a plurality of racks 12 that are each configured with a plurality of antenna elements 14. Racks 12 are spatially separated from one another for transmitting and receiving microwave radiation at various angles relative to one or more targets of interest. According to the teachings of the present disclosure, the azimuthal orientation of the antenna elements 14 configured on a particular rack 12 is adjustable relative to the azimuthal orientation of the antenna elements 14 of another rack 12. Antenna elements configured on each rack 12 have an elevational orientation that is also adjustable relative to other antenna elements 14 in its respective rack 12. Thus, the scan pattern developed by antenna array 10 may be tailored according to the nature and type of imagery to be generated and/or the characteristics of the terrain or other background objects in the vicinity of various targets of interest.

Each rack 12 has an upper coupling mechanism 16 and a lower coupling mechanism 18 that are each coupled to an elongated upper rail 20 and an elongated lower rail 22, respectively. Upper coupling mechanism 16 and lower coupling mechanism 18 forms an axis for rotation of its respective rack 12 relative to the other racks 12. In one embodiment, upper rail 20 is disposed above lower rail 22 for maintaining racks 12 in a generally vertical orientation. In this manner, antenna elements 14 may transmit or receive microwave radiation from a generally lateral direction. In other embodiments, upper rail 20 and lower rail 22 may support racks 12 at any suitable orientation for transmission or receipt of microwave radiation at virtually any orientation. Each rack 12 supports a plurality of antenna elements 14 at a desired azimuthal orientation relative to upper rail 20 and thus to each other. Each antenna element 14 is coupled to its respective rack 12 through a collar 24 that extends around the periphery of its respective antenna element. Details of upper coupling mechanism 16, lower coupling mechanism 18, and collar 24 will be described in detail below.

Antenna elements 14 may be include any type of device that transmits and/or receives microwave radiation for generation of inverse synthetic aperture radar imagery. In the particular embodiment shown, antenna elements 14 are generally horn-shaped and operate in the L-band of the microwave spectrum, which includes frequencies in the range of 40 to 60 Giga-Hertz (GHz). Given this range of frequencies, each antenna element 14 has a length of approximately 1.5 feet and a front aperture of approximately 1.0 foot by 1.0 foot.

Inverse synthetic aperture radars typically operate by moving a transmit and receive beam of microwave radiation across a target of interest in a controlled manner. In some cases, the transmit and receive beam may be rotated across the target of interest while multiple signals from the received beam are processed. Techniques used for this mode of movement may include a motorized mechanism that spins its antenna array across a target or an active electronically scanned array (AESA) that scans its transmit and receive beams across the target using the combined radiation pattern of multiple antenna elements. In the present embodiment, antenna elements 14 may have an orientation that remains relatively fixed during acquisition of microwave radiation reflected from the target. The generally static nature of antenna elements 14 may, therefore, be relatively less complex and smaller in size than other antenna elements configured for use with inverse synthetic aperture radars in some embodiments.

Figure 2:
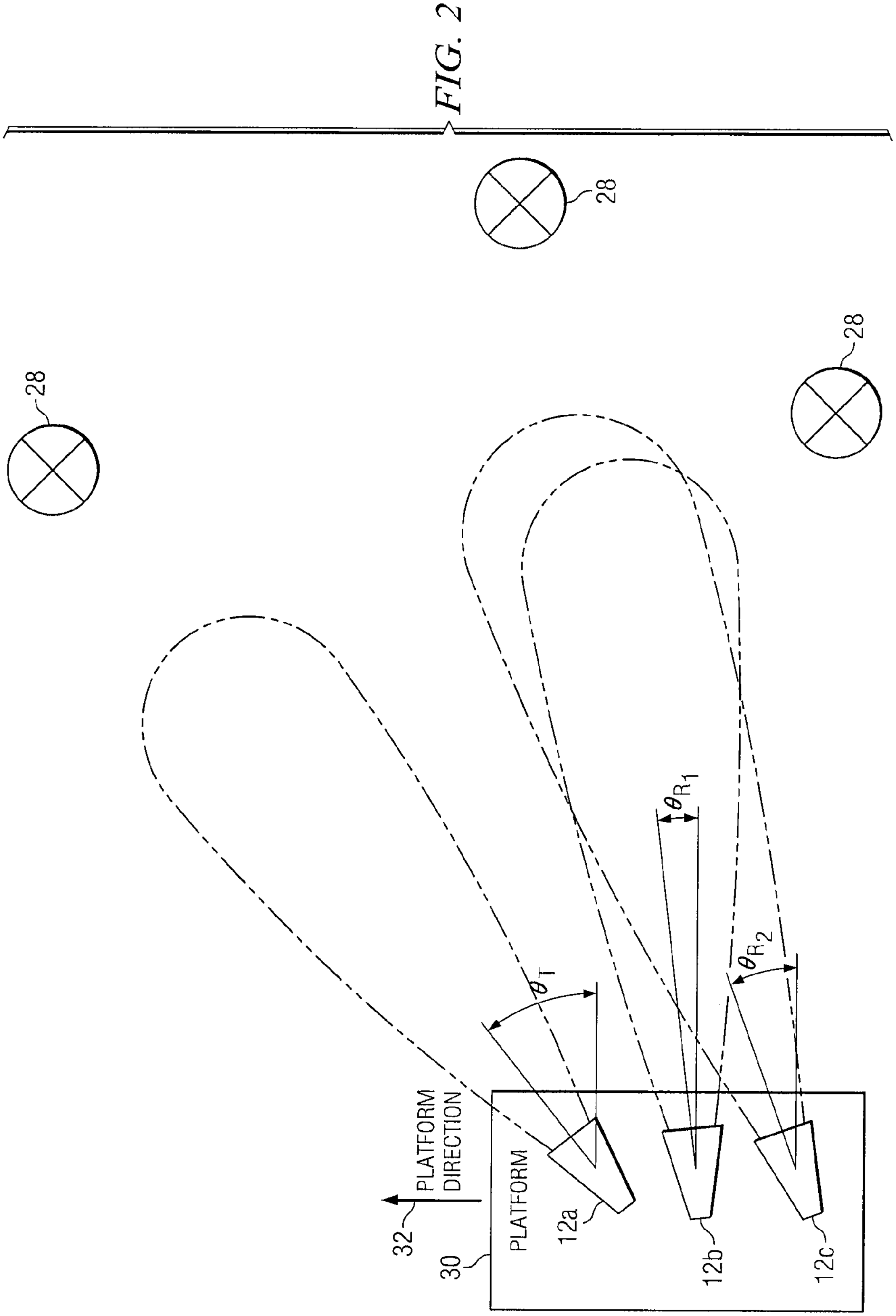
FIG. 2 is a plan view of the antenna array of FIG. 1 showing how the racks may be oriented to generated imagery of one or more targets.

FIG. 2 is a diagram showing how antenna array 10 may be used to acquire multiple reflected signals from one or more targets 28 for generation of inverse synthetic aperture radar imagery. Antenna array 10 is configured on a movable platform 30 that moves in a direction 32 laterally with respect to one or more targets 28. Movable platform 30 may include any movable structure, such as, for example, an automobile, a train, a bus, a watercraft, or an aircraft. For example, movable platform 30 may be an automobile that moves antenna array 10 over a roadway for generating inverse synthetic aperture radar imagery of targets 28 that may include buildings or other structures in close proximity to the roadway.

In the particular embodiment shown, antenna elements in rack 12*a* are configured to transmit microwave radiation, while antenna elements 14 configured in rack 12*b* and 12*c* are configured to receive microwave radiation such that a total of three racks are implemented. In other embodiments, any plurality of racks 12 may by used in which any subset of racks 12 may be delegated for transmission of microwave radiation while the other racks 12 are delegated for receipt of microwave radiation. In another embodiment, certain antenna elements 14 within each rack 12 may be alternatively delegated for transmission or receipt of microwave radiation. In yet another embodiment, each antenna element 14 in each rack 12 may be configured to transmit and receive microwave radiation.

Movement of movable platform 30 relative to targets provide spatial separation along its direction of movement while the azimuthal orientation and physical separation of each rack 12 from one another provide spatial separation normal to the movable platform's direction 32. Spatial separation along these axes provide for the generation of inverse synthetic aperture radar imagery. As shown, rack 12*a* transmits microwave radiation at a direction $\theta_t$ relative to movable platform 30 while racks 12*b* and 12*c* receives reflected microwave radiation from targets 28 at directions $\theta_{r1}$ and $\theta_{r2}$, respectively. Directions $\theta_t$, $\theta_{r1}$, and $\theta_{r2}$ of racks 12*a*, 12*b*, and 12*c*, respectively, may be selected according to various factors, such as the anticipated velocity of movable platform 30, the size and complexity of targets 28, and/or the type of background terrain features around targets 28.

Figure 3:
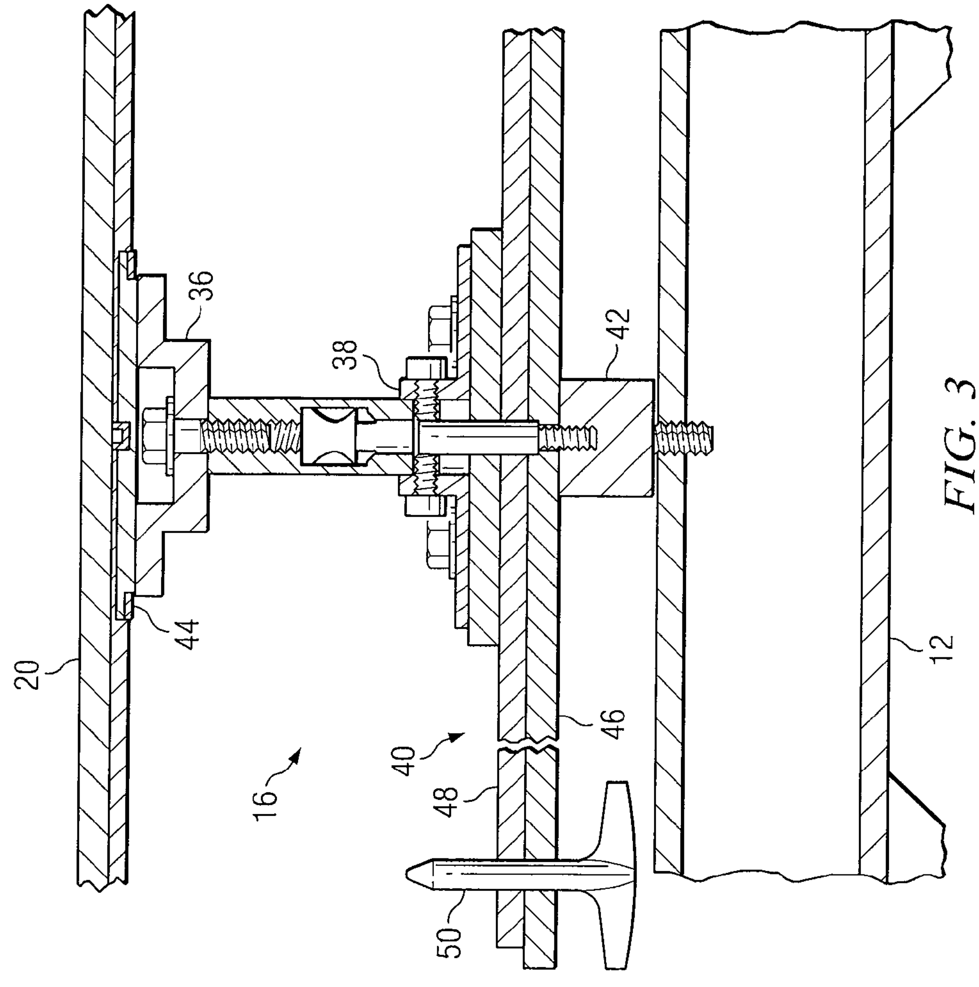
FIG. 3 is an enlarged, perspective view of one embodiment of an upper coupling mechanism that may be used to couple each rack to the upper rail of the antenna array of FIG. 1.

FIG. 3 is an enlarged, cross-sectional, elevational view of one embodiment an upper coupling mechanism 16 that couples one rack 12 to upper rail 20. Upper coupling mechanism 16 includes a rail mount 36, a universal joint 38, a radial locking mechanism 40, and a shock absorber 42 that are coupled to one another between upper rail 20 and rack 12 as shown. Rail mount 36 couples upper rail 20 to universal joint 38 and is slidingly engaged in a channel 44 formed in upper rail 20. Thus, rail mount 36 provides for lateral movement of rack 12 along upper rail 20, while universal joint allows bending of rack 12 relative to upper rail 20. Shock absorber 42 is made of any suitable material, such as rubber, and is disposed between radial locking mechanism and rack 12 for absorbing vibrational energy from upper rail 20. In one embodiment, shock absorber 42 has an elastic coefficient such that rack 12 and shock absorber 42 have a natural resonant frequency of approximately 18 Kilo-Hertz (KHz). A natural resonant frequency of 18 Kilo-Hertz may be higher than most anticipated perturbations during movement on movable platform 30 that may reduce potential unwanted oscillation of racks 12 during movement.

Radial locking mechanism 40 includes a plate 46 and an arm 48 that is rigidly coupled to universal joint 38 for remaining at a fixed angular orientation relative to upper rail 20. A pin 50 is provided that may be selectively inserted through one of a plurality of holes configured in plate 46 and a hole configured in arm 48 for maintaining rack 12 at a desired angular orientation relative to upper rail 20.

Figure 4:
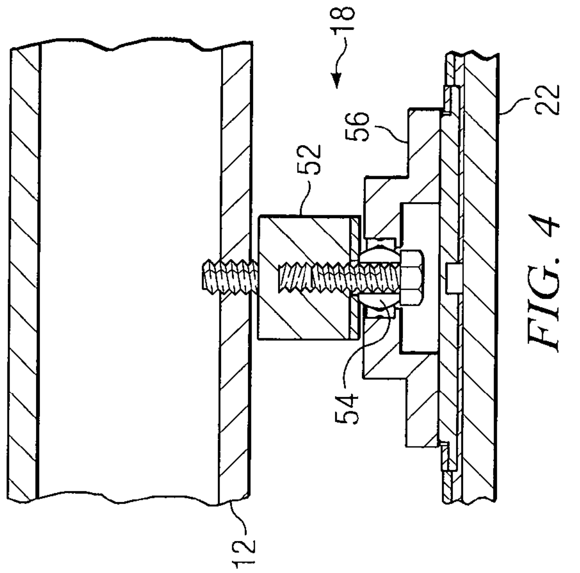
FIG. 4 is an enlarged, elevational view of one embodiment of a lower coupling mechanism that may be used to couple each rack to the lower rail of the antenna array of FIG. 1.

FIG. 4 is an enlarged, cross-sectional view of one embodiment of a lower coupling mechanism 18 that may be used to couple rack 12 to lower rail 22. Lower coupling mechanism 18 includes a shock absorber 52, a spherical bearing 54, and a rail mount 56 that are coupled together as shown. Shock absorber 52 is formed of a suitable material, such as rubber, for absorbing vibrational energy from lower rail 22. Similar to shock absorber 42, shock absorber 42 has an elastic coefficient such that rack 12 and shock absorber 42 have a natural resonant frequency of approximately 18 Kilo-Hertz. Spherical bearing 54 is provided to allow bending of rack 12 relative to lower rail 22. In a manner similar to rail mount 36 of FIG. 3, rail mount 56 is slidingly coupled to lower rail 22 for providing lateral movement of rack 12 relative to lower rail 22.

Figure 5A:
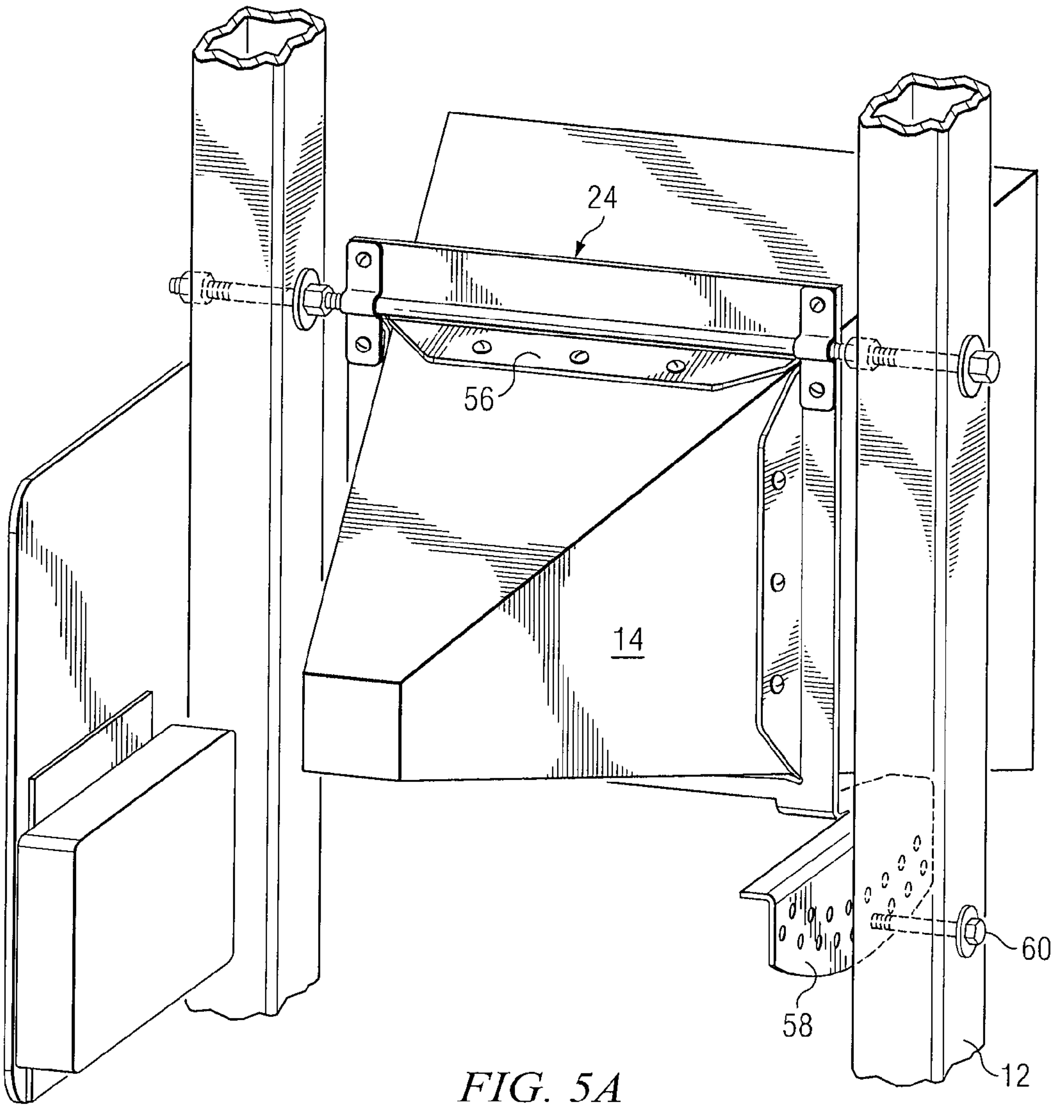
FIGS. 5A and 5B are enlarged, perspective views of one embodiment of a collar that may be implemented to couple each antenna element to its respective rack.

FIG. 5A is an enlarged, partial, perspective view of one embodiment of a rack 12 in which a collar 24 is implemented for securing one antenna element 14 to rack 12. Collar 24 is hingedly coupled to rack 12 by a rod 56 that extends through both beams of rack 12. Collar 24 includes a plate 58 that is configured with a plurality of holes. In its operational position, plate 58 lies proximate one beam of rack 12 such that a pin 60 may be selectively inserted through rack 12 and one hole configured in plate 58 for maintaining antenna element 14 at a desired elevational orientation relative to its respective rack 12.

Figure 5B:
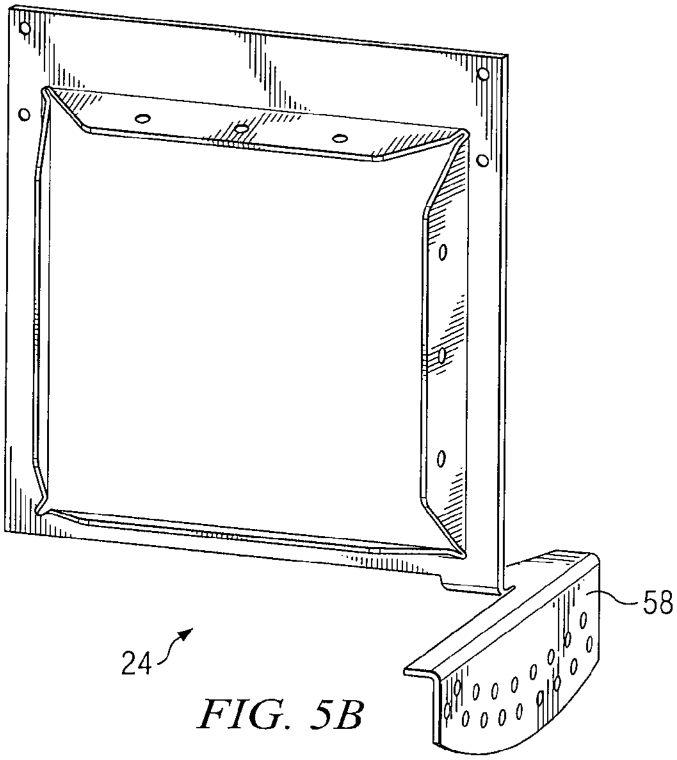

FIG. 5B shows a perspective view of collar 24 that has been removed from rack 12 and its associated antenna element 14. As shown, collar 24 may be cut from a single piece of sheet metal and bent several times to produce a shape suitable for securing antenna element 14 to rack 12.

Figure 6:
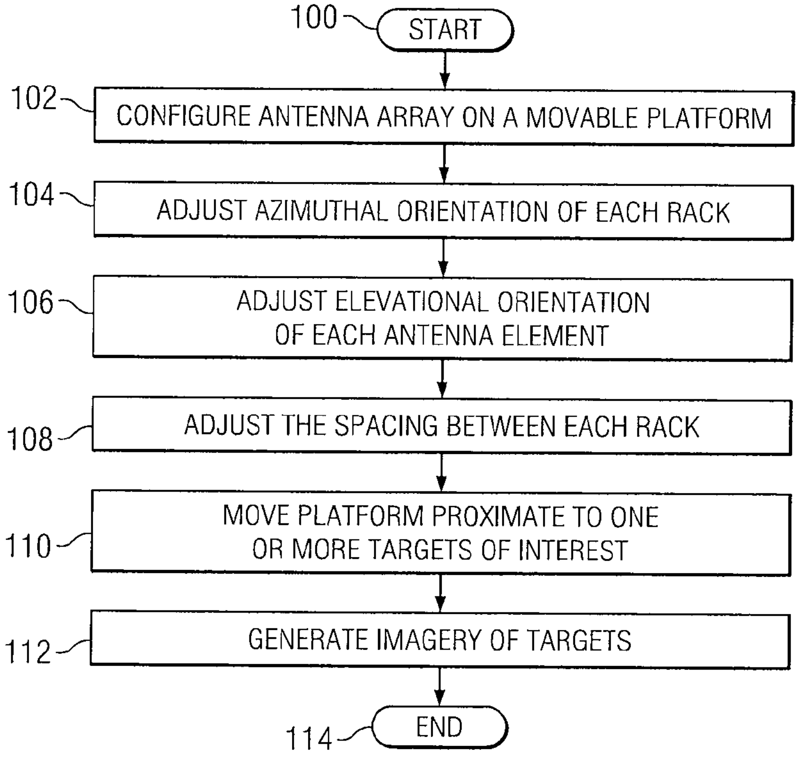
FIG. 6 is a flowchart showing one embodiment of a series of actions that may be performed to operate the antenna array of FIG. 1.

FIG. 6 is a flowchart showing one embodiment of a series of actions that may be performed to use the antenna array 10. In act 100, the process is initiated.

In act 102, antenna array 10 is configured on a suitable movable platform 30 that may be moved in close proximity to one or more targets 28 of interest. In one embodiment, targets

28 are located at a position that is in close proximity to a road such that antenna array 10 may be configured on a vehicle for movement over the road during acquisition of imagery of targets 28. In this particular case, the axes of racks 12 are mounted vertically such that the orientation of antenna elements 14 are directed laterally from the vehicle.

In act 104, the azimuthal orientation of each rack 12 is adjusted relative to one another. In one embodiment, antenna elements 14 of one rack 12 are configured to transmit microwave radiation while the other two racks 12*b* and 12*c* are configured to receive microwave radiation reflected from targets 28. Given this configuration, the scan pattern of the transmit beam generated by antenna elements 14 in rack 12*a* or the scan pattern of the receive beams from antenna elements 14 in racks 12*b* and 12*c* may be controlled in a relatively consistent and easy manner.

In act 106, the elevational orientation of each antenna element 14 configured in each rack 12 is independently adjusted relative to other antenna elements 14. Individual adjustment of the elevational orientation of each antenna element 14 may provide control over the scan pattern of the transmit or receive beam that is normal to the direction of movable platform 30. For example, antenna elements 14 may be adjusted to have a relatively wide variation in elevational orientation for acquisition of imagery from targets 28, such as tall buildings, while antenna elements 14 may be adjusted to have a relatively narrow variation in elevational orientation for shorter buildings or other targets 28 that may be further away.

In act 108, the spacing between each rack 12 is adjusted. Spacing between each rack 12 affects spatial separation between the transmit beam and receive beam. For example, spacing between racks 12 may be increased due to an anticipated speed of a particular movable platform 30 that may be relatively slower than normal. For the embodiment described above in which antenna elements 14 of two racks 12*b* and 12*c* form the receive beam, spacing between these two racks 12*b* and 12*c* may also be tailored to obtain a desired spatial separation or the received beams.

In act 110, the movable platform 30 is moved within the vicinity of the one or more targets 28 of interest. During this time, synthetic aperture radar imagery is generated by the transmit and receive beams generated by antenna elements 14 as they cross through the target's location in act 112.

The previously described process continues throughout acquisition of imagery to gather information about targets 28. When operation of antenna array 10 is no longer needed or desired, the process ends in act 114.

Modifications, additions, or omissions may be made to the method without departing from the scope of the disclosure. The method may include more, fewer, or other acts. For example, azimuthal rotation of racks 12 and/or elevational rotation of individual antenna elements 14 may be provided by servo motors that provide adjustments during acquisition of inverse synthetic aperture radar imagery in accordance with one embodiment. Thus, the azimuthal and elevational orientations of antenna elements 14 may be adjusted while imagery is being acquired.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. An antenna array comprising:

an elongated top rail disposed parallel to an elongated bottom rail;

a plurality of racks coupled between the elongated top rail and the elongated bottom rail, each of the plurality of racks operable to be rotated about an axis and disposed at a spaced apart distance from each other, the spaced apart distance between each rack being adjustable, the axis of each of the plurality of racks being essentially parallel to one another; and a plurality of antenna elements that are configured to transmits and receive microwave radiation in the L-band are configured on each of the plurality of racks, the plurality of antenna elements in each rack having an axial orientation that is essentially similar to one another and having a second orientation that is adjustable relative to one another, the second orientation being normal to the axial orientation;

wherein the plurality of antenna elements configured on at least one of the plurality of racks is operable to transmit microwave radiation and the plurality of antenna elements configured on the other plurality of rack are operable to receive electromagnetic radiation.

2. An antenna array comprising:

a plurality of racks operable to be rotated about an axis and disposed at a spaced apart distance from each other, the axis of each of the plurality of racks being essentially parallel to one another; and a plurality of antenna elements configured on each of the plurality of racks, the plurality of antenna elements in each rack having an axial orientation that is essentially similar to one another and having a second orientation that is adjustable relative to one another, the second orientation being normal to the axial orientation.

3. The antenna array of claim 2, further comprising an elongated top rail configured parallel to an elongated bottom rail, the plurality of racks each coupled to and extending between the top rail and the bottom rail.

4. The antenna array of claim 3, wherein each of the plurality of racks are coupled to the top rail and the bottom rail through a pair of shock absorbers.

5. The antenna array of claim 3, wherein each of the plurality of racks are coupled to the top rail through a universal joint.

6. The antenna array of claim 2, wherein the plurality of racks comprise a first rack, a second rack, and a third rack, the plurality of antenna elements of the first rack operable to transmit microwave radiation and the plurality of antenna elements of the second rack and the third rack operable to receive microwave radiation.

7. The antenna array of claim 2, wherein the spaced apart distance between each of the plurality of racks is adjustable.

8. The antenna array of claim 2, wherein the plurality of antenna elements are operable to transmit or receive the microwave radiation in the L-band of the microwave spectrum.

9. The antenna array of claim 2, wherein each of the plurality of antenna elements is coupled to its respective rack through a collar, the collar extending around and secured to an outer periphery of the each antenna element.

10. The antenna array of claim 9, wherein the collar is formed from a single piece of metal.

11. A method of generating inverse synthetic aperture radar imagery comprising:

providing a plurality of racks rotatable about an axis and disposed a spaced apart distance from each other, the axis of each of the plurality of racks being essentially parallel to one another and aligned along a common plane, and a plurality of antenna elements configured on each of the plurality of racks, the plurality of antenna elements in each rack having an axial orientation that is essentially similar to one another and a second orientation that is adjustable relative to one another, the second orientation being normal to the axial orientation;

adjusting the axial orientation of each of the plurality of racks with respect to one another, adjusting the second orientation of each antenna element relative to other antenna elements configured on its respective rack;

moving the antenna array relative to a target; and generating imagery using microwave radiation received by at least a subset of the plurality of antenna elements.

12. The method of claim 11, further comprising aligning the axes of the plurality of racks to be essentially vertical, wherein generating imagery using the microwave radiation comprises generating imagery using the microwave radiation from a target that is laterally disposed from the antenna array.

13. The method of claim 11, wherein providing the antenna array further comprises providing the antenna array including an elongated top rail and an elongated bottom rail, the plurality of racks coupled between the elongated top rail and the elongated bottom rail.

14. The method of claim 11, further comprising transmitting microwave radiation from the plurality of antenna elements configured on a first rack of the plurality of racks, the subset of the plurality of antenna elements configured on a second rack and a third rack of the plurality of racks.

15. The method of claim 11, further comprising adjusting the spaced apart distance between each of the plurality of racks.

16. The method of claim 11, wherein generating imagery using microwave radiation comprises generating imagery using microwave radiation in the L-band of the microwave spectrum.

17. The method of claim 11, wherein providing the antenna array comprising the plurality of antenna elements configured on each of the plurality of racks comprises providing the plurality of antenna elements that are each secured to its respective rack using a collar that extends around and secured to an outer periphery of its respective antenna element.

18. The method of claim 17, further comprising forming the collar from a single piece of metal.

* * * * *

UNITED STATES PATENT AND TRADEMARK OFFICE

CERTIFICATE OF CORRECTION

PATENT NO. : 7,724,176 B1
APPLICATION NO. : 12/404041
DATED : May 25, 2010
INVENTOR(S) : James A. Pruett et al.

It is certified that error appears in the above-identified patent and that said Letters Patent is hereby corrected as shown below:

Column 2:
Line 40, after "Antenna elements" please insert -- 14 --.

Column 3:
Line 41, after "shown, antenna elements" please insert -- 14 --.
Line 55, after "to targets" please insert -- 28 --.

Column 4:
Line 15, after "mechanism" please insert -- 40 --.

Signed and Sealed this
Eighth Day of November, 2011

David J. Kappos

*Director of the United States Patent and Trademark Office*